(12) United States Patent
Knudsen et al.

(10) Patent No.: US 8,331,889 B2
(45) Date of Patent: Dec. 11, 2012

(54) AUTOMATIC FUSE ARCHITECTURE

(75) Inventors: Mikael Bergholz Knudsen, Gistrup (DK); Feridoon Jalili, Gistrup (DK); Michael Wilhelm, Furstenfeldbruck (DE); Bernd Adler, Neubiberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 763 days.

(21) Appl. No.: 11/757,956

(22) Filed: Jun. 4, 2007

(65) Prior Publication Data

US 2008/0300021 A1    Dec. 4, 2008

(51) Int. Cl.
*H04B 1/16*    (2006.01)

(52) U.S. Cl. ...................................... 455/217; 455/226.1

(58) Field of Classification Search .................. 455/522, 455/67.11, 133, 140, 143, 188.1, 217, 226.1, 455/552.1
See application file for complete search history.

(56) References Cited

U.S. PATENT DOCUMENTS

| | | | |
|---|---|---|---|
| 5,878,334 A * | 3/1999 | Talisa et al. ................... 455/217 |
| 6,366,766 B1 * | 4/2002 | Dalebroux ..................... 455/217 |
| 2006/0052131 A1* | 3/2006 | Ichihara ...................... 455/552.1 |
| 2007/0242784 A1* | 10/2007 | Sampson et al. .............. 375/347 |

* cited by examiner

*Primary Examiner* — Ping Hsieh
(74) *Attorney, Agent, or Firm* — Eschweiler & Associates, LLC

(57) ABSTRACT

An automatic fuse architecture is described. An incoming signal is received and detected to determine whether the signal exceeds a threshold value.

17 Claims, 3 Drawing Sheets

AUTOMATIC FUSE ARCHITECTURE

BACKGROUND

The mobile communication industry is facing an increasing demand for high data rate applications (e.g., video, multimedia, and so forth). To meet this demand, standards like High Speed Downlink Packet Access (HSDPA) and High Speed Uplink Packet Access (HSUPA) are being developed within the Universal Mobile Telecommunications System (UMTS) mobile phone standard. These higher data rates generally require better signal quality between a mobile device and a base station, where the mobile device may be a mobile phone and the base station may be a cellular tower.

The signal quality and range may be enhanced by increasing the number of base stations in order to reduce the maximum distance between a given base station and the mobile device. For example, in a cellular network system, increasing the number of cellular towers effectively decreases the distance between a given mobile device in the network and the nearest cellular tower. However, this solution would be cost prohibitive due in part to the high cost of installing and maintaining additional base stations.

The range of high data rate transfer within a communication system may also be increased using a primary antenna with a diversity antenna to create two receiver chains within the mobile device. According to a typical design, the primary antenna sends and receives signals, whereas the diversity antenna is dedicated to signal reception. The diversity antenna complements the primary antenna by preventing fading, where fading is defined by a reduction of signal quality and/or transmission rate.

The diversity antenna typically experiences an isolation effect with the primary antenna. The isolation effect may reduce the TX power of the signal that is received by the diversity antenna. A diversity antenna switch associated with the diversity antenna may be designed to take advantage of this isolation effect. For example, the so-called "front end" of the switch may be optimized by omitting typical primary filter components, such as the duplex filter and external low noise amplifier (LNA). Omitting these components results in cost and space savings, as well as other benefits.

Under normal operating conditions, the lack of the duplex filter and other front end components in the diversity receiver is acceptable due to the isolation that occurs between the primary antenna and the diversity antenna, which limits the signal power received by diversity antenna. However, under certain abnormal conditions, the isolation between the primary antenna and diversity antenna can be dramatically lowered. The abnormal conditions may be caused by placing the diversity antenna too close to, or on, a metal plate or by other abnormalities that the mobile device may experience. Under these and other abnormal conditions, relatively fragile and power sensitive components, such as a Surface Acoustic Wave (SAW) filter associated with the diversity antenna, may be exposed to power levels close to, or equal to, the fully transmitted signal power. The excessive signal power may damage or even destroy these components.

DETAILED DESCRIPTION

This disclosure describes the design and use of a switch for preventing a signal from reaching power sensitive components, such as filter elements, active devices and/or passive devices and so forth, under certain abnormal conditions. Some specific examples of power sensitive components include SAW filters, tunable filters, tunable matching circuits, isolators, circulators, Low Noise Amplifiers (LNAs), mixers, Analog-to-Digital Converter (ADCs), diplexers, and so forth.

In a described implementation, a diversity antenna system has an antenna switch to direct an incoming signal to one or more filter elements, where each filter element may handle a signal related to a particular signal frequency. The antenna switch may also have a detector to sense the power of the incoming signal. If the detector detects that the signal exceeds a predetermined threshold, the signal may be prevented from reaching the filter elements by directing the signal to a termination point.

According to another implementation, a device is described that receives an incoming signal from an antenna and outputs a signal to control logic. The device also includes a detection mechanism operable to determine the power of the incoming signal from the antenna and to communicate a signal to the control logic to direct the signal to either the filter or the termination point based upon the power of the incoming signal measured by the detector.

According to yet another implementation, a method is disclosed that includes detecting an incoming signal received by an antenna. If the signal is below a predetermined threshold, the signal may be directed to a filter element. If the signal exceeds the predetermined threshold, the signal may be directed to a termination point. The techniques described herein may be implemented in a number of ways. One example environment and context is provided below with reference to the included figures and on going discussion.

Exemplary Environment

Figure 1:
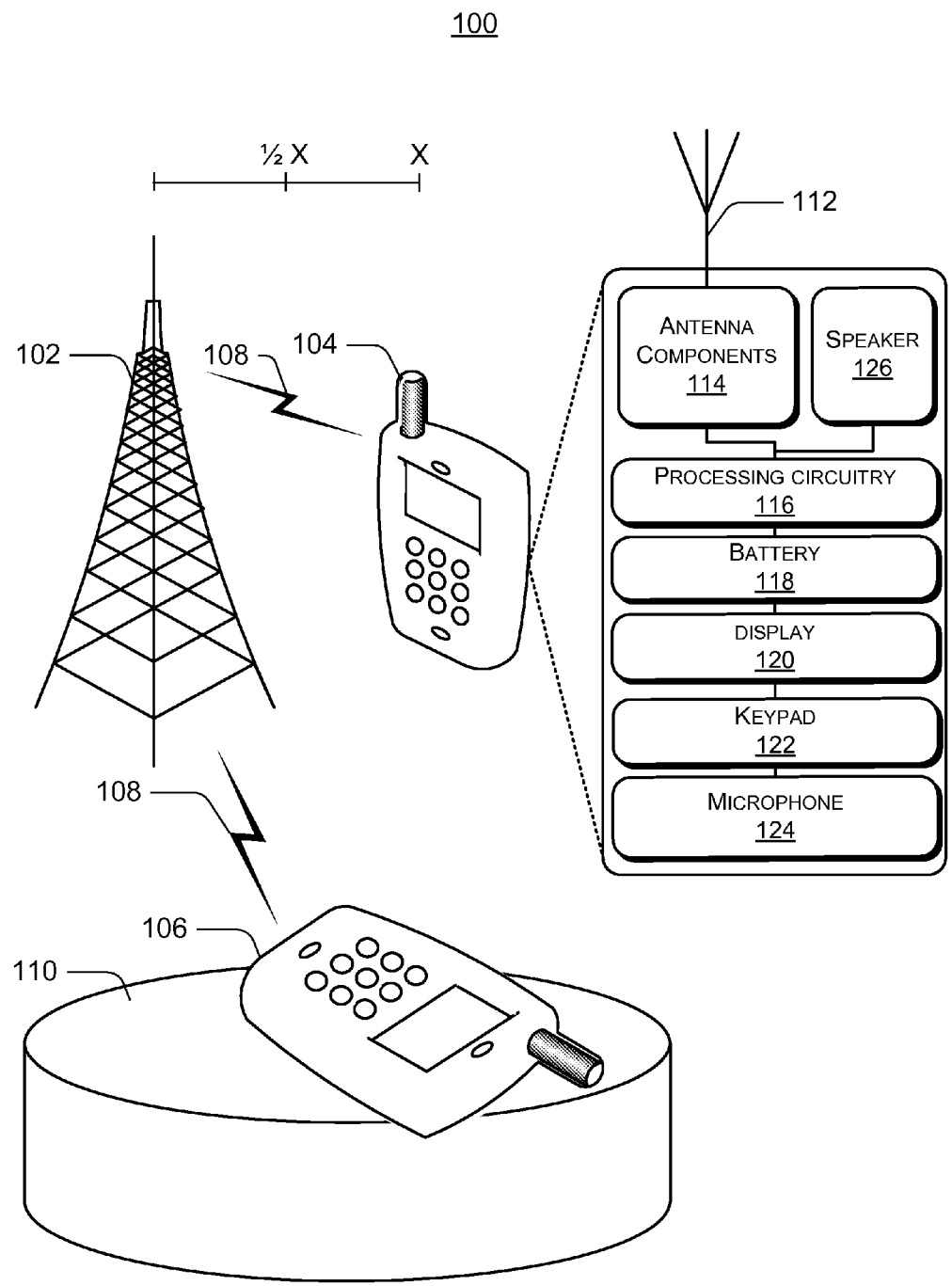
FIG. 1 shows an exemplary base station and exemplary mobile devices for sending and receiving transmissions.

FIG. 1 shows a mobile communication system 100 having a base station 102 and one or more mobile devices 104 or 106. The mobile communication system 100 is representative of a cellular network, in which the base station 102 represents a cellular phone tower or other device capable of transmitting and/or receiving one or more radio or other wireless signals 108 within a cell of a cellular network. The mobile devices 104 and 106 represent cellular phones, wireless media devices, or other devices capable of receiving and/or transmitting a radio or other wireless signal 108. For example, the mobile device 104 or 106 may alternatively be a personal digital assistant (PDA), a portable computing device capable of wireless communication, a media player device, a portable gaming device, and/or a wireless access point (WAP). Mobile devices 104 and 106 may be identical, with mobile device 104 representing a device operating under normal conditions and mobile device 106 representing a device operating under abnormal conditions. The abnormal conditions may be caused, for example, by placing the mobile device 106 too near, or on, a metal plate 110, a human body, or other obstacle. For convenience, mobile device 104 will be used for reference and any description thereof is applicable to mobile device 106, unless otherwise indicated.

The mobile device 104 includes an antenna 112 to communicate with the base station 102. Antenna 112 may be configured to transmit and/or receive the signal 108 and may represent a primary antenna and/or a diversity antenna. The signal 108 may initially be processed by antenna components 114, which may include filters, receivers, transmitters, and so forth. The antenna components may send the signal to processing circuitry 116. A battery 118 provides power to the processing circuitry 116 and other components of the mobile device 104. The mobile device 104 may also have components for user interaction, such as a display 120 (e.g., liquid crystal display), a keypad 122, a microphone 124, and/or a speaker 126.

Suppose the mobile device 104 is operating under normal conditions at the edge of a cell, as denoted in FIG. 1 as a distance "X". The signal quality may be limited by a number of factors, including thermal noise, the noise figure of the receiver, and the channel quality (fading). The limited signal quality may limit reliable data transfer, particularly for high rate data transfers, such as may be required for video transmission as well as for communication of internet content. The signal quality may improve by decreasing the distance between the mobile device and the base station by, for example one-half, as denoted by the distance "½X" in FIG. 1. However, as described above, it is generally desired to provide an optimal signal quality regardless of the location of the mobile device 104 within the network.

Therefore, according to one implementation, the antenna 112 includes a primary antenna and a diversity antenna with antenna components 114 supporting the two antennas. The primary antenna sends and receives signals, whereas the diversity antenna is dedicated to signal reception. The diversity antenna complements the primary antenna by preventing fading, where fading is defined by a reduction of signal quality and/or transmission rate. One particular implementation of the dual antenna system is described next, with reference to FIG. 2.

Dual-Antenna Structure

Figure 2:
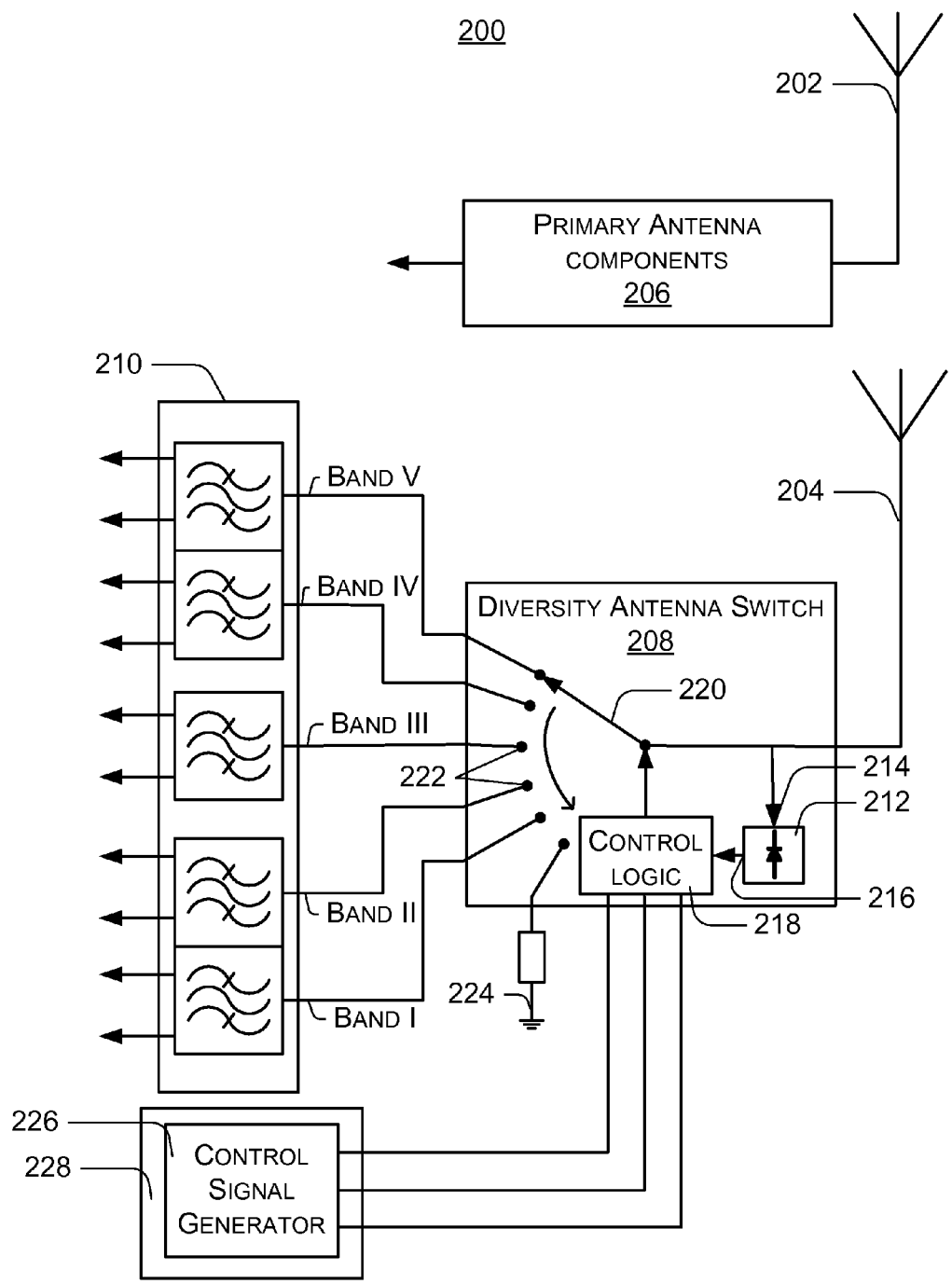
FIG. 2 shows an exemplary system having a primary antenna and a diversity antenna.

FIG. 2 shows an exemplary dual-antenna structure 200 with a primary antenna 202 and a diversity antenna 204. According to this implementation, the primary antenna 202 transmits and/or receives signals using primary antenna components 206, which may include a transmitter, receiver, filters, and so forth. The diversity antenna 204 is dedicated to signal reception and complements the primary antenna 202 by preventing fading. The diversity antenna 204 includes a diversity antenna switch 208 to direct signals to power sensitive components, such as filters, active and passive devices, and so forth. For example, the antenna switch 204 may direct signals to different filter elements in a Surface Acoustic Wave (SAW) filter mechanism 210 based on the frequency of the signal. The outputs of the primary antenna components 206 and/or the SAW filter mechanism 210 are transmitted to further circuitry of a mobile device, such as processing circuitry 116 (FIG. 1). Such circuitry would be within the knowledge of one of skill in the art and is not shown for the sake of simplicity. Likewise, well-known components associated with the antennas, such as so-called "matching" components in the SAW filter mechanisms, are not shown or described in detail herein as their configuration is not critical to this discussion.

The signal power at the primary antenna 202 may not generally be realized by the diversity antenna 204 due to isolation between the antennas. The extent of this isolation depends on the design of structure 200. The antennas 202 and 204 may be designed for minimal isolation in order to optimize diversity performance. For example, in normal operation, approximately 10 decibel (dB) of isolation attributable to isolation may be present between the two antennas.

The diversity switch 208 may be designed to take advantage of the isolation effect. For example, since the diversity antenna 208 is affected by isolation, certain components, such as the duplex filter and external low noise amplifier (LNA), are omitted from the front end of the switch 208

To illustrate isolation by way of example, a typical transmission may be transmitted at about 25 dBm (Decibel referenced to milliwatts). Considering the 10 dB isolation described above, the diversity antenna 204 generally receives an input power of 15 dBm. Any given filter element in the SAW filter mechanism 210 typically has a maximum input power of 15 dBm. Thus, the actual power input into the SAW filter mechanism 210 is less than, or equal to, the maximum power that can be handled by any of the filter elements in the SAW filter mechanism 210. According to these normal operating conditions, the SAW filter mechanism 210 is capable of handling the level of power received by diversity antenna 204 without being damaged.

Under abnormal conditions, however, the isolation between the primary antenna 202 and diversity antenna 204 may be dramatically reduced which increases the power of the signal sent to the SAW filter mechanism 210. In fact, under these abnormal conditions, the filter elements in the SAW filter mechanism 210 may be exposed to power levels close, or equal, to the fully transmitted power. Continuing with the example from above, the filter elements in the SAW filter mechanism 210 may be exposed to, for example, 25 dBm rather than the 15 dBm for which the filters in SAW filter mechanism 210 are designed. This excessive signal power might potentially damage or even destroy the SAW filter mechanism 210.

The high power experienced at the filter elements under abnormal conditions may be addressed in several ways. According to one implementation, the filters are designed to be sufficiently robust to handle the power without degradation over time. According to another implementation, a detector 212 is inserted between the diversity antenna 204 and the SAW filter mechanism 210. The detector 212 may have an input terminal 214 to receive an incoming signal from the antenna and an output terminal 216 connected to control logic 218. The detector 212 may be operable to determine whether the input signal has a power that exceeds a threshold value. The threshold value may be based, for example, upon the power handling capabilities of the filter elements in the SAW filter mechanism 210. If the signal power exceeds the threshold value, the detector 212 informs the control logic 218, which prevents the signal from reaching the SAW filter mechanism 210.

More particularly, the control logic 218 directs a switch 220 to send the signal received by antenna 204 to one of several electrical portals 222. Each portal 222 connects to a different SAW filter element in the SAW filter mechanism 210 or to a termination point 224, which may be a load, open, ground, or "off" mode connection. For example, six portals 222 are shown in FIG. 2 and are configured to handle five frequency bands and the termination point 224. The control logic 218 may be controlled by three-bit control signals generated by a signal generator 226 associated with a processing unit 228 as is well known in the art. Control logic 218 includes hardware, software, or a combination thereof. The three-bit control signal may include three individual digital signals. Each incoming digital signal is either high (1) or low (0), enabling multiple three-bit signal combinations including, for example: [000], [001], [011], [111], [110], [100], [010], and [101]. Each digital signal combination may direct the switching mechanism 220 to a different portal 222 in the diversity antenna switch 208. Thus, for example, a three bit signal of [000] may direct the switching mechanism 220 such that the signal from the antenna 204 travels to the termination point 224. A control signal corresponding to [001] may direct the switching mechanism 220 such that the signal is directed from the antenna 204 to Band I, which may correspond to a filter for handling a ~2100 MHz frequency signal, and so forth. Of course, the switching mechanism may be directed to any number of paths by increasing the number of bits processed by the control logic 218 and increasing the number of portals 222.

If the input signal power exceeds the threshold value, e.g., the maximum power of the filters in the SAW filter mechanism 210, the detector 212 or the control logic 218 directs the switching mechanism 220 to a termination point 224. The termination point 224 may be a ground, load, open circuit, or "off" mode connection. According to one implementation, the detector 212 may be a diode that operates either as a short or as an open circuit depending on whether the incoming signal exceeds the threshold power value. Thus, when the signal received by the detector 212 exceeds the threshold value, the detector sends a signal to the control logic 218 to direct the switch 220 to the termination point 224. When the signal received by the detector 212 is below the threshold value, the detector may send no signal to the control logic 218, thereby acting as an open circuit. Additionally or alternatively, the diode may connect directly to the termination point (i.e. not through the control logic) such that the detector operates as an open circuit under normal conditions and as a short to the termination point under abnormal conditions.

The termination point 224, may be an "off" mode connection that sends an "off" signal back to the processing unit 228. The processing unit 228 may render the mobile device, or a portion of the device, inoperable for a predetermined period. The predetermined period may be based upon a preselected passage of time (e.g., 30 seconds), the cessation of the abnormal condition, or the reactivation of the device by a user. Reactivation may involve pressing a power button on the device, resetting the battery, or other action by the user. The "off" mode connection may be in addition to, or as an alternative to, a load or ground termination.

Operation

Figure 3:
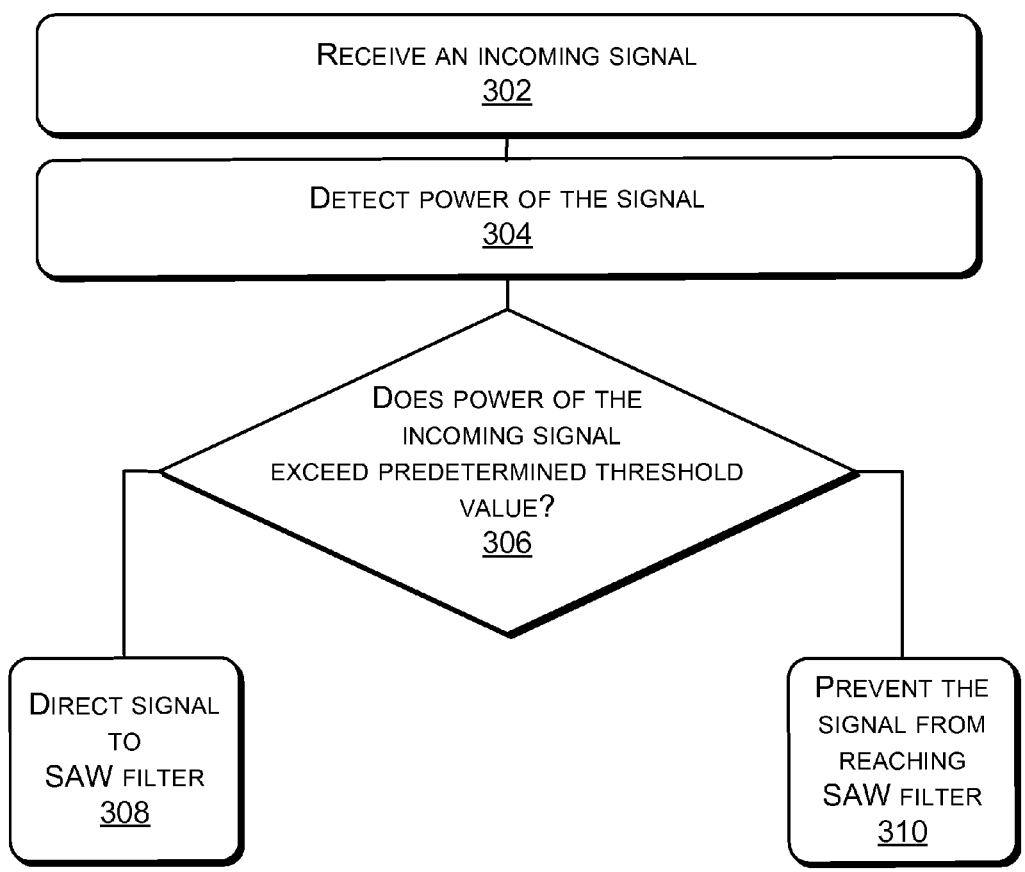
FIG. 3 shows an exemplary method of operating a diversity antenna with a detector.

FIG. 3 shows an exemplary process 300 of detecting power incoming to a diversity antenna and, in response, preventing the power from reaching filters. This process 300 may be implemented with the antenna structure shown in FIG. 2, though the process is not limited to such an implementation. The process is illustrated as a collection of referenced acts arranged in a logical flow graph, which represent a sequence that can be implemented in hardware, software, or a combination thereof. In the context of software, the acts represent computer-executable instructions that, when executed, perform the recited operations. The order in which the acts are described is not intended to be construed as a limitation, and any number of the described acts can be combined in any order and/or in parallel to implement the process 300.

At 302, an incoming signal is received. More particularly, the signal may be received by an antenna, such as a primary antenna and/or a diversity antenna. The received signal is sent to a switch. The switch may be designed to direct the signal incoming from the antenna (e.g. the diversity antenna) to one or more ports connected to SAW filters, where each port corresponds to a different signal frequency.

At 304, the signal is detected to evaluate, measure, and/or determine its characteristics. In one implementation, a detector 212 may be inserted in, or associated with, the antenna switch to assist in this evaluation. The detector 212 may include a diode to determine the signal's power.

At 306, whether the power of the incoming signal exceeds a predetermined threshold value is determined. If the power does not exceed the predetermined threshold value, the signal is directed toward the SAW filters at 308. However, if the power exceeds the predetermined threshold value, the signal is prevented from reaching the SAW filters at 310. The signal is prevented from reaching the SAW filters by, for example, sending the signal to a termination point, such as a load, ground, open, or "off" mode connection. The process may be automatic, such that the detector acts as fuse to automatically direct the signal to the termination point if the detected power exceeds the threshold value. According to this exemplary method, SAW filters associated with the antenna switch are protected from damage or destruction.

Conclusion

Although the subject matter has been described in language specific to structural features and/or methodological steps, it is to be understood that the subject matter defined in the appended claims is not necessarily limited to the specific features or acts described. Rather, the specific features and acts are disclosed as preferred forms of implementing the claims.

The invention claimed is:

1. A system comprising:
   a primary antenna port configured to receive a first input signal from a primary antenna;
   a diversity antenna port configured to receive a second input signal from a diversity antenna, wherein the first and second input signals are related to one another;
   a switch coupled to the diversity antenna port and operable to direct selectively the second signal received at the diversity antenna port to one of a plurality of power sensitive and frequency dependent components or to a termination point based on a control signal supplied thereto;
   a detector operable to detect the power of the second signal and generate an alarm signal if the power of the second signal exceeds a predetermined threshold amount; and
   a control component coupled to the switch and the detector and configured to direct the switch via the control signal to direct the second signal to the termination point upon a receipt of the alarm signal from the detector,
   wherein the detector and the control component form a feed-forward type control loop with respect to the switch.

2. The system as recited in claim 1, wherein the predetermined threshold amount is based on a maximum signal power that the power sensitive and frequency dependent component can withstand before being damaged.

3. The system as recited in claim 1, wherein the termination point is one of a load, open, or ground connection.

4. The system as recited in claim 1, further comprising a processing unit, and wherein the termination point is a terminal connected to the processing unit that is operable to place a device into an "off" mode.

5. The system as recited in claim 1, wherein the control component is operable to direct the switch to direct the signal to the termination point in response to a signal sent by the detector that the second signal received at the detector exceeds the predetermined threshold amount.

6. The system as recited in claim 1, wherein the detector comprises a diode.

7. The system as recited in claim 6, where the diode operates as one of an open circuit or as a short circuit based upon whether the power of the detected signal exceeds a threshold value.

8. A device comprising:
   a primary antenna port configured to receive a first input signal from a primary antenna;

a diversity antenna port configured to receive a second input signal from a diversity antenna, wherein the first and second input signals are related to one another;

an input terminal configured to receive the second signal from the diversity antenna port;

a detection mechanism operable to alter selectively a path of the second signal based upon a power of the second signal; and a switch connected to the detection mechanism, the switch operable to direct the second signal received from the diversity antenna port to one of a plurality of different paths based on a control signal supplied thereto;

wherein the detection mechanism comprises a diode, the diode being connected to a termination point, wherein and the diode is reversed biased and operates as an open circuit when the power of the second signal is below a threshold value and the diode breaks down and operates as a short circuit to the termination point, thereby bypassing the switch when the power of the second signal is above the threshold value.

9. A method comprising:

receiving an incoming signal from a diversity antenna;

detecting an amount of power of the incoming signal;

determining whether the power of the incoming signal exceeds a predetermined threshold value; and preventing the incoming signal from reaching a plurality of power and frequency sensitive components if the incoming signal exceeds the predetermined threshold value by directing the incoming signal to a processing unit, the incoming signal operable to cause a portion of a device to be inoperable for a period; or providing the incoming signal to one of the plurality of power and frequency sensitive components if the incoming signal is lower than or equal to the predetermined threshold value and the frequency is within a predetermined frequency range for the plurality of power and frequency sensitive component using an antenna switch that is coupled to the plurality of power and frequency sensitive components and a termination point.

10. The method as recited in claim 9, wherein preventing the incoming signal from reaching the power and frequency sensitive component further comprises directing the incoming signal to the termination point.

11. The method as recited in claim 9, wherein the power and frequency sensitive component is a Surface Acoustic Wave filter associated with the diversity antenna and the predetermined threshold value is based upon the maximum power capabilities of the Surface Acoustic Wave filter.

12. The method as recited in claim 9, wherein determining whether the power of the incoming signal exceeds a predetermined threshold value further comprises inserting a diode to create an open circuit when the incoming signal received from the diversity antenna is below a predetermined threshold value and a short circuit when the incoming signal received from the diversity antenna exceeds a predetermined threshold value.

13. The method as recited in claim 9, wherein the period is a predetermined period of time.

14. The method as recited in claim 13, wherein the predetermined period of time is 30 seconds.

15. The method as recited in claim 9, wherein the incoming signal is operable to place the device into an "off" mode.

16. The method as recited in claim 9, wherein the period ends upon an input to the device from a user.

17. The method as recited in claim 9, wherein the device is a mobile device.

* * * * *